United States Patent [19]
Robinson

[11] 3,804,431
[45] Apr. 16, 1974

[54] CONVERTIBLE SHOPPING CART

[76] Inventor: Fredric A. Robinson, 6625 N. Glenwood Ave., Chicago, Ill. 60626

[22] Filed: Mar. 8, 1972

[21] Appl. No.: 232,819

[52] U.S. Cl............ 280/36 C, 280/36 R, 280/47.18
[51] Int. Cl................................................ B62b 1/12
[58] Field of Search............ 280/47.18, 36 R, 41 R, 280/31, 36 C; 248/224; 220/6, 7

[56] References Cited
UNITED STATES PATENTS

| | | | |
|---|---|---|---|
| 3,388,920 | 6/1968 | Hill, Sr. et al. | 280/47.18 X |
| 2,732,159 | 1/1956 | Connors et al. | 248/224 |
| 1,339,355 | 5/1920 | Kohlman | 280/31 U X |
| 2,594,153 | 4/1952 | Greffe | 220/6 |
| 2,632,653 | 3/1953 | Rollie et al. | 280/36 R X |
| 2,754,889 | 7/1956 | Lovelace | 280/36 R X |
| 3,111,332 | 11/1963 | Birch | 280/31 |
| 3,168,328 | 2/1965 | Hill, Sr. | 280/47.18 X |

FOREIGN PATENTS OR APPLICATIONS

| | | | |
|---|---|---|---|
| 858,843 | 5/1940 | France | 280/36 R |
| 168,697 | 4/1934 | Switzerland | 280/41 A |

Primary Examiner—David Schonberg
Assistant Examiner—John A. Pekar
Attorney, Agent, or Firm—Hill, Sherman, Meroni, Gross & Simpson

[57] ABSTRACT

A convertible shopping cart which can be utilized as a rectangularly shaped basket suspended within and supported by a metal frame attached to and supported by two ground wheels wherein the rectangularly shaped basket may be moved to a substantially vertical position and is locked in that position by a disc-shaped pivot member attached on either side of the basket or frame and wherein the basket may be moved to a secondary horizontal position and locked in that position. The basket has a first pair of ground wheels which may be released to serve as front wheels with the wheels of the frame serving as the rear wheels. The basket can be completely removed from the frame and a second pair of ground wheels may be pivoted downwardly to allow the basket to be used independently as a cart. The frame and basket are collapsible to a stored position when not in use.

3 Claims, 9 Drawing Figures

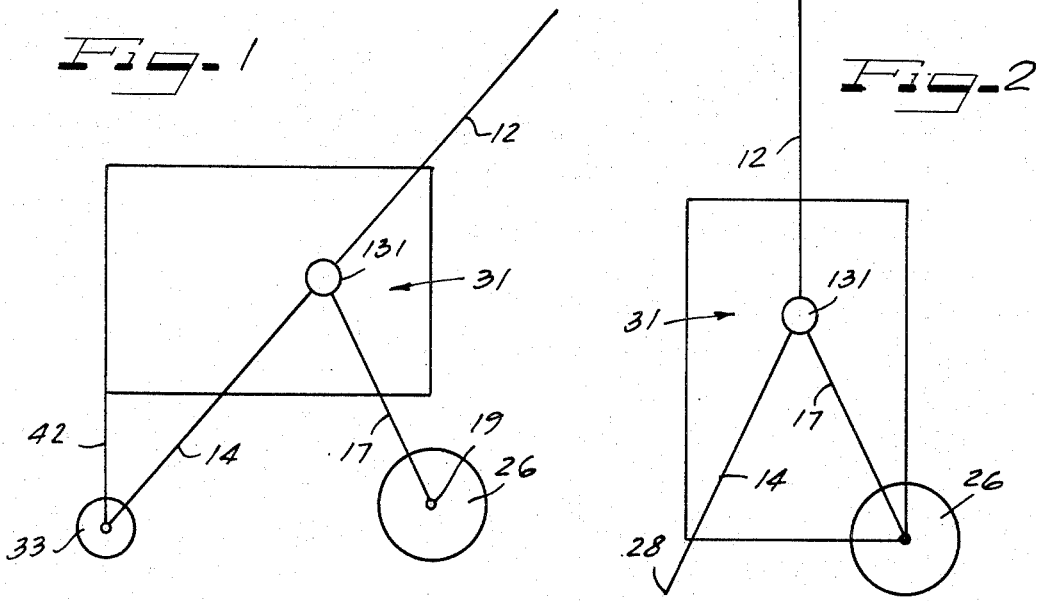
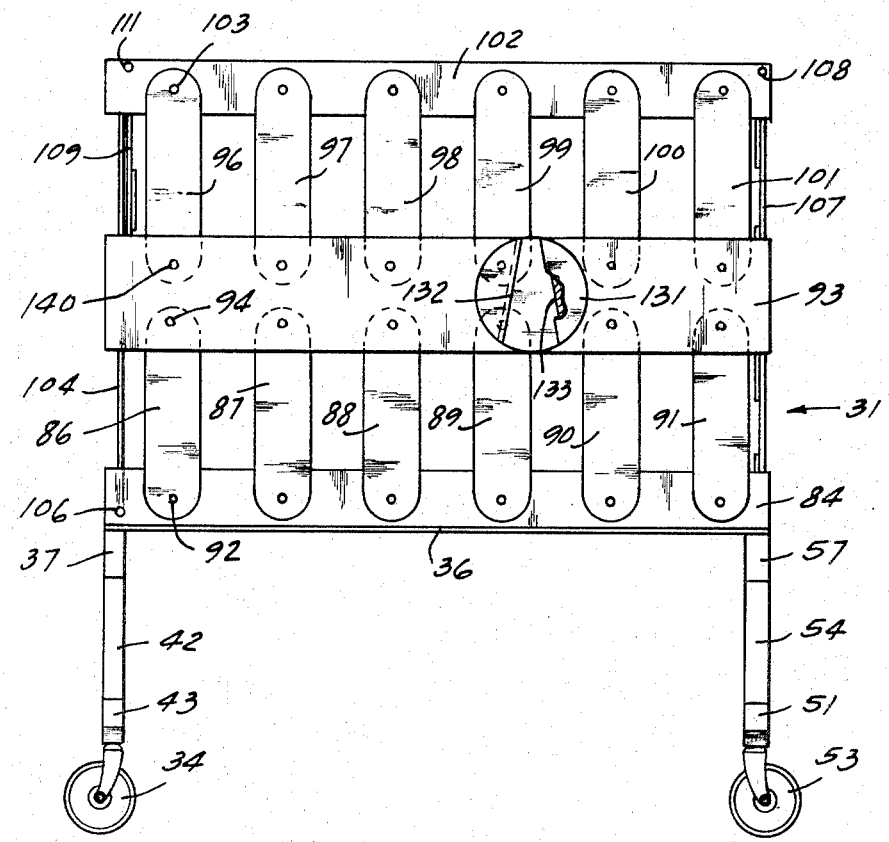

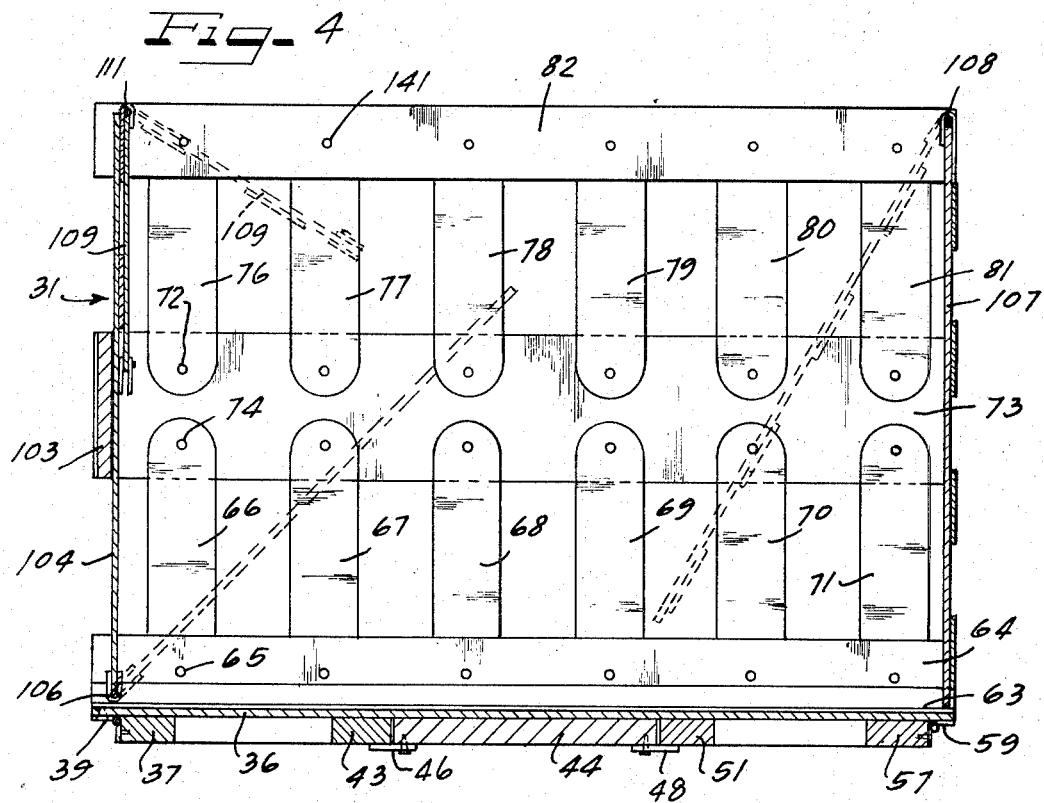
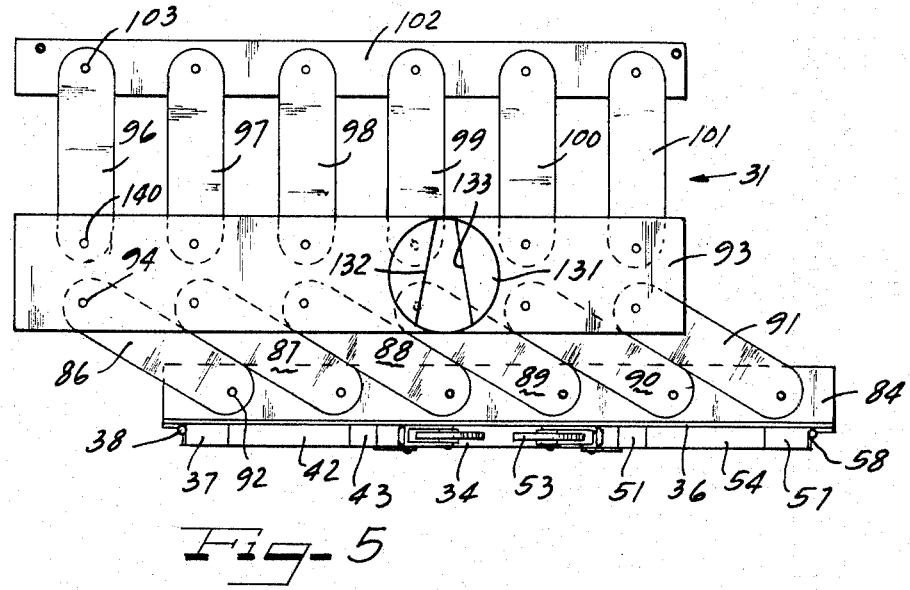

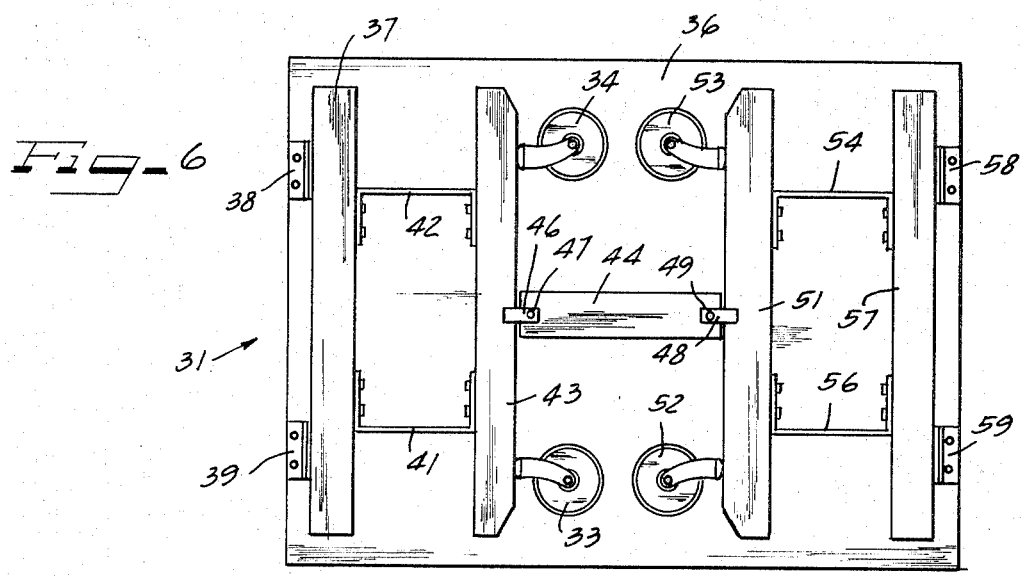
Fig-6
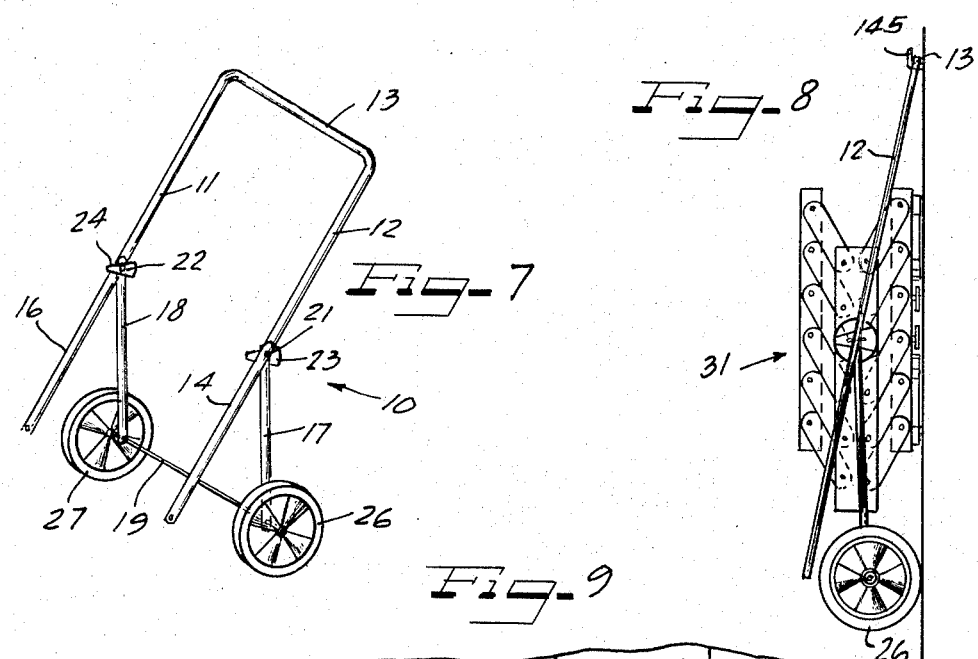
Fig-7
Fig-8
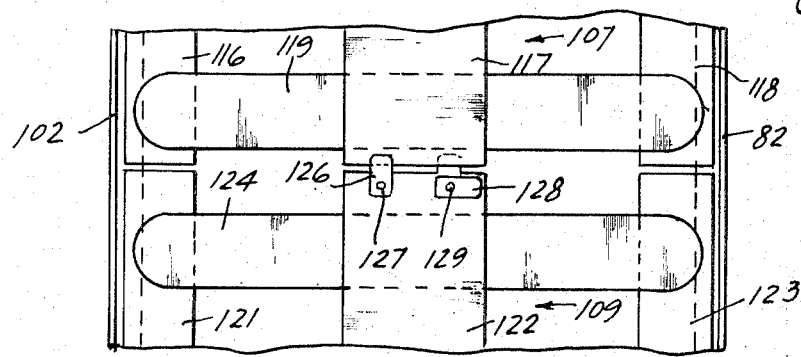
Fig-9

CONVERTIBLE SHOPPING CART

BACKGROUND OF THE INVENTION

1. Field of the Invention

This invention relates in general to a convertible shopping cart and in particular to a combination basket and cart that may be used and operated in various modes.

2. Description of the Prior Art

Baskets having a substantially vertically extending container with ground wheels are known and are used, for example, for transporting groceries or other articles from a grocery store to home by the housewife. Also, grocery carts which have a substantially horizontal basket and which are provided with four ground wheels and a push and pulling handle are known.

SUMMARY OF THE INVENTION

The present invention comprises a convertible shopping cart which includes a basket which has four pivotally attached ground wheels that may be moved to the stored or extended position so as to allow the basket to operate as a cart independent of a frame member which is also provided by the invention. The frame member comprises a handle and a pair of ground wheels which are mounted on a suitable bracket member and which is adapted to be detachably connected to the basket so as to support the basket in either a substantially horizontal or a substantially vertical position. With the basket in the substantially vertical position the ground wheels of the basket are retracted and the ground wheels of the frame and a pair of front leg supports support the basket in the rest position. When the basket is pivoted to the substantially horizontal position a pair of the ground wheels attached to the basket are moved to the extended position and serve with the ground wheels of the frame to provide a four wheel cart. The frame and basket can be completely disconnected and the frame can be utilized as a clotheshanging device. For storage purposes, the basket and frame can be folded to a substantially thin configuration allowing the device to be hung on the wall of a garage, for example, in a compact stored position.

Other objects, features and advantages of the invention will be readily apparent from the following description of certain preferred embodiments thereof taken in conjunction with the accompanying drawings, although variations and modifications may be effected without departing from the spirit and scopy of the novel concepts of the disclosure and in which:

BRIEF DESCRIPTION OF THE DRAWINGS

FIG. 1 is a side plan view of the convertible shopping cart of this invention with the cart in the substantially horizontal position;

FIG. 2 is a side plan view of the cart of this invention with the basket in the substantially vertical position;

FIG. 3 is a side plan view of the basket of this invention with the ground wheels extended;

FIG. 4 is a side sectional view of the basket;

FIG. 5 is a side view of the basket showing the basket partially collapsed;

FIG. 6 is a bottom plan view of the basket with the wheels in their stored position;

FIG. 7 is a perspective view of the stand;

FIG. 8 illustrates the stand and basket in the collapsed position for storage; and FIG. 9 is an enlarged detail view of the side wall of the basket.

DESCRIPTION OF THE PREFERRED EMBODIMENTS

The present invention comprises a convertible shopping cart which includes a rectangular shaped basket which is suspended within and supported by a metal frame that has a pair of ground wheels. A coupling and pivot disc is attached to either side of either the basket or the frame which has a mating member and the basket can be locked in a vertical position or in a horizontal position. When the basket is in the vertical position it may be moved by the frame handle of the frame member and the ground wheels. When the basket is in the horizontal position a pair of folding ground wheels may be extended from the underside of the basket so as to provide a shopping cart which operates on the extended wheels from the basket and the ground wheels of the frame member. The basket may be folded to a compact position such that the frame and basket may be stored in a compact space.

The basket can also be completely removed from the frame and used with the wheels either extended or retracted. Wheels are provided at both ends of the basket to provide a movable cart.

FIGS. 1 and 2 illustrate the basket and frame in the assembled position. In FIG. 1 the basket 31 is in the horizontal position and has its forward ground wheels 33 and 34 extended. The frame member has a handle portion 12 and a leg 17 pivotally attached to the handle portion 12 which supports ground wheels 26 and 27. A forward pivoted support leg 14 is movable to the position shown in FIG. 1 so that it does not engage the ground and allows the cart to be freely moved by the handle 12.

FIG. 2 illustrates the cart 31 in the vertical position with the front leg 14 having its end 28 in engagement with the ground so as to provide a support and the cart may be moved by pivoting the stand with the handle 12 about the ground wheels 26 and 27.

The stand is shown in greater detail in FIG. 7 and is designated generally as 10. A generally U-shaped handle member has upwardly extending arms 11 and 12 joined by a handle portion 13. Front pivoted legs 14 and 16 are connected by pivot pins 21 and 22 to the handle arms 11 and 12. Thumb screws are receivable on pins 21 and 22 respectively. Rear legs 17 and 18 are also connected to the handle and front leg portions by the pivot pins 21 and 22 and carry ground wheels 26 and 27 at their lower ends which are supported by an axle 19 that passes through openings formed in the legs 17 and 18. Wedge-shaped connecting means 23 and 24 are attached to the locking and pivot means 21 and 22 and are for detachably engaging mating disc shaped members mounted on the sides of the basket so as to support the basket 31 in either the horizontal or vertical positions.

The basket is shown in detail in FIGS. 3-6 and 9.

FIG. 6 illustrates the bottom 36 of the basket to which are attached retractable ground wheels 33, 34, 52 and 53. The wheels 33 and 34 are mounted in casters which are received in a transverse member 43 which extends from a pivoted transverse member 37 which is connected by hinges 38 and 39 to the bottom 36. Support members 41 and 42 are attached to the bottom 36 and is provided with a latch 46 which is pivotally connected by pin 47 adjacent one end of the member 44 so as to latch the wheels 33 and 34 in the retracted position as shown in FIG. 6. A latch 48 is pivoted to the member 44 by pin 49 to latch the wheels 52 and 53 in the retracted position as shown in FIG. 6. The wheels 52 and 53 are caster mounted to a transverse member 51 which is supported by members 56 and 54 from a transverse member 57 which is pivotally attached by hinges 58 and 59 to the bottom 36. When the latches 46 and 48 are moved to the unlocked position, wheels 33 and 34, and 52 and 53 may be moved to the extended position illustrated in FIG. 3 and suitable detents, not shown, are provided for locking the wheels in the down position. It is to be realized, of course, that one pair of the wheels may be retracted and the other pair extended if desired as, for example, when the cart is used in the mode illustrated in FIG. 1.

As shown in FIGS. 3, 4 and 5, the bottom 36 is provided with upwardly extending members 84 and 64 on opposite sides thereof and the sides of the basket are formed by folding wall members. The wall on the near side of the basket comprises a first plurality of links 86–91 which are pivotally attached by pivot pins 92 to the member 84 at their lower ends. The upper ends of links 86–91 are pivotally connected by pivot pins 94 to an intermediate planar member 93. Upper link members 96–101 are pivotally connected by pivot pins 140 to the planar member 93. The upper edge of the basket 102 is pivotally connected by pivot pins 103 to the upper ends of the links 96–101 as shown in FIGS. 3 and 5.

As best shown in FIG. 4, the other side of the basket comprises upper and lower planar members 64 and 82 and a center planar member 73. Lower links 66–71 are pivotally attached to the planar member 64 by pivot pins 65 and have their upper ends pivotally attached to the intermediate planar member 73 by pivot pins 74. Upper links 76–81 are pivotally connected at their lower ends by pivot pins 72 to the intermediate member 73 and have their upper ends pivotally attached to the member 82 by pivot pins 141.

At the left end relative to FIGS. 3, 4 and 5, a reinforcing transverse member 103 is connected between the members 73 and 93 so as to provide support for the bottom of the basket when it is in the vertical position. This member might be made of wood, for example. A member 104 which provides the end when the basket is in the horizontal position and the bottom when the bottom is in the vertical position is pivotally supported by a pivot shaft 106 to the members 84 and 64. An end member 107 closes the right end relative to FIGS. 3 and 4 when the basket is in the horizontal position and is attached to the members 102 and 82 by a pivot shaft 108.

Since the dimensions of the basket are such that it is longer than its height, the end member 107 does not completely enclose the sides of the basket when the basket is in the vertical position. To complete the closure of this side when the basket is in the vertical position, a pivotal closure member 109 is attached by pivot shaft 111 to members 82 and 102 adjacent the upper left end relative to FIGS. 3 and 4. When the basket is in the vertical position, closure member 109 is connected to the member 107 as shown in detail in FIG. 9.

The closure member 107 has planar side members 116 and 118 and a center planar member 117 parallel to side members 116 and 118. Member 109 is also provided with spaced transverse planar members 119 which extend between members 116, 117 and 118. The member 109 is formed with planar side members 121 and 123 and a parallel center planar member 122. Transverse planar members 124 are attached between the members 121, 122 and 123, as shown in FIG. 9. A first pair of latch links 126 are pivotally connected by pin 127 to the member 122 adjacent the end thereof on either side thereof and are pivotal to a position as shown in FIG. 9 such that their ends engage the member 117 of member 107 on either side thereof and thus lock the ends of members 107 and 109 together. A second pair of latch members 128 are also pivotally attached by pin 129 to opposite sides of the member 122 and are engageable with opposite sides of the end of member 117. In FIG. 9, the latch members 126 are in the latched position and the top latch member 128 relative to the drawing is in the unlatched position. Thus, means are provided for detachably connecting the ends of members 107 and 109 to form a side wall.

Wedge-shaped members 23 and 24 on the frame member 10 are receivable in disc members 131 which are attached to the members 93 and 73. Members 23 and 24 are formed with mating cam surfaces 132 and 133 so as to provide a sliding connection with the wedge-shaped members 23 and 24. The wedge-shaped surfaces 132 and 133 are tapered as shown in cut-away in FIG. 3 and the opening becomes larger at the inner confines adjacent the member 93, for example. The wedge-shaped members 23 and 24 are tapered in the transverse direction as well as in the longitudinal direction so as to lock the wedge-shaped members 23 and 24 to the disc members 131 when they are inserted.

In operation the convertible shopping cart may be stored as shown in FIG. 8 and the handle may have its transverse portion 13 placed over a supporting storage hook 145 and the basket may be collapsed as shown so that the minimum storage space is required for the convertible shopping cart. Thus the device may be stored in a garage or basement or hallway. When the device is in use it is moved from the storage hook and may be rolled on the ground wheels 26 and 27 in the collapsed or open position as desired. If the basket is to be used in the vertical position as shown in FIG. 2, the basket is opened and the members 107 and 109 connected as shown in FIG. 9 to provide a side wall, if they are not already in that position.

If the cart is to be used with the basket in the horizontal position as shown in FIG. 1, the basket is pivoted by loosening the thumb screws on pivot pins 21 and 22 and by pivoting the wedge members 22 and 23 and the basket to the horizontal position and then retightening the thumb screws. In this position the links 126 and 128 are moved to disconnect pivoted member 107 from member 109 and member 107 is moved to the position shown in FIG. 4 thus providing the right end relative to FIG. 4 of the basket. The top of the basket is then opened. The member 109 pivots to the position shown in FIG. 4 at the left end of the basket against member 104. The front ground wheels 33 and 34 are released by releasing the latch 46 to allow the wheels 33 and 34 to drop to the position shown in FIG. 1 and a four wheel cart is provided with the wheels 26 and 27 of the frame member 10 and the front wheels 33 and 34 of the basket.

If desired, the basket may be removed from the frame by lifting the disc-shaped pivots 131 from the associated wedge members 23 and 24. The basket may then be used as a four wheel cart by extending the legs 52 and 53 by releasing the latch 48 and this mode is shown in FIG. 3. The basket may also be used with the legs in the retracted position.

The cart may be utilized in many modes. As for example, the basket may be collapsed as shown in FIG. 8 and pivoted to a horizontal position and then be utilized as a serving tray, at picnics.

Although the invention has been described as to preferred embodiments, it is not to be so limited as changes and modifications may be made therein which are within the full intent and scope as defined by the appended claims.

I claim:

1. A convertible cart comprising: a frame member provided with a first pair of ground wheels and a handle portion; a basket pivotally and detachable connected to said frame member and lockable in at least two angular positions relative to said frame member, wherein said basket is formed with a bottom member and a pair of opposite side wall members which are foldable, and first, second, and third pivotal walls pivotally attached to said pair of said side walls so as to provide opposite end walls when the basket is in a first position with the bottom member in a substantially horizontal plane, said first, second, and third pivotal walls movable to respectively form adjacent side and bottom walls when said bottom member lies in a substantially vertical plane, wherein when said bottom member is horizontal said basket has a larger dimension in the horizontal direction than in the vertical direction and said third pivotal wall attached to said pair of side walls and movable to be detachably connected to said one of pivotal walls when said bottom member lies in a substantially vertical plane.

2. A convertible cart according to claim 1 wherein said side wall members are formed of three parallel planar members with a first plurality of link members pivotally connected between first and second ones of said parallel planar member and a second plurality of link members pivotally connected between second and third ones of said parallel planar members.

3. A convertible cart according to claim 1 wherein said third pivotal wall is movable to lie parallel against the second of said pair of pivotal walls when said bottom member lies in a substantially horizontal plane.

* * * * *